United States Patent
Ma et al.

(10) Patent No.: US 7,432,614 B2
(45) Date of Patent: Oct. 7, 2008

(54) SINGLE-INDUCTOR MULTIPLE-OUTPUT SWITCHING CONVERTERS IN PCCM WITH FREEWHEEL SWITCHING

(75) Inventors: Dongsheng Ma, Kowloon (HK); Wing-Hung Ki, New Territories (HK); Chi-Ying Tsui, Kowloon (HK)

(73) Assignee: Hong Kong University of Science and Technology, Hong Kong (CN)

( * ) Notice: Subject to any disclaimer, the term of this patent is extended or adjusted under 35 U.S.C. 154(b) by 189 days.

(21) Appl. No.: 10/745,696

(22) Filed: Dec. 29, 2003

(65) Prior Publication Data

US 2004/0201281 A1    Oct. 14, 2004

Related U.S. Application Data

(60) Provisional application No. 60/440,612, filed on Jan. 17, 2003.

(51) Int. Cl.
*H02J 1/00* (2006.01)
*H02J 3/00* (2006.01)

(52) U.S. Cl. .................................................. 307/31

(58) Field of Classification Search .............. 307/31
See application file for complete search history.

(56) References Cited

U.S. PATENT DOCUMENTS

| | | | |
|---|---|---|---|
| 5,617,015 A | | 4/1997 | Goder et al. |
| 6,075,295 A | * | 6/2000 | Li ................................. 307/39 |
| 6,075,344 A | * | 6/2000 | Kawai ........................ 320/134 |
| 6,259,235 B1 | * | 7/2001 | Fraidlin et al. .............. 323/222 |
| 6,522,108 B2 | * | 2/2003 | Prager et al. ................ 323/222 |
| 6,600,670 B2 | * | 7/2003 | Morita et al. ................. 363/89 |

\* cited by examiner

*Primary Examiner*—Michael J Sherry
*Assistant Examiner*—Dru M Parries
(74) *Attorney, Agent, or Firm*—Schwabe, Williamson & Wyatt, P.C.

(57) ABSTRACT

A method and apparatus are disclosed for single-inductor multiple-output switching converter design. With the proposed freewheel switching control, this converter operates in a pseudo-continuous conduction mode (PCCM) and is capable of handling large load currents with a much smaller current ripple and peak inductor current, while retaining low cross regulation. It can also work in discontinuous conduction mode (DCM) for high efficiency at light loads. This design can be applied to have single or multiple outputs and for different types of DC-DC conversions.

18 Claims, 5 Drawing Sheets

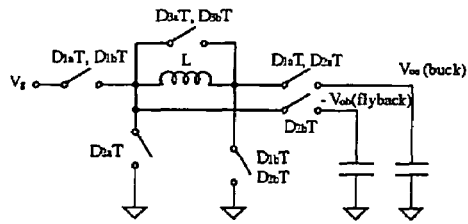
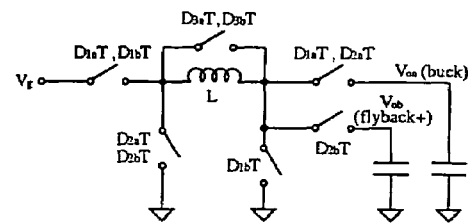
Fig. 6(e)   Fig. 6(f)
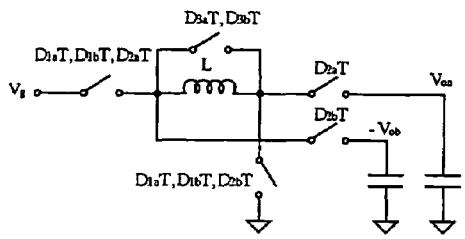
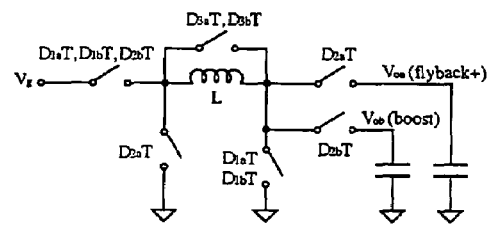
Fig. 6(g)   Fig. 6(h)
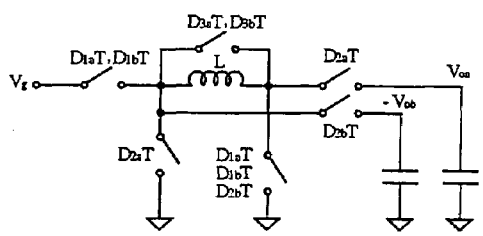
Fig. 6(i)
Fig. 6(a)-6(i)
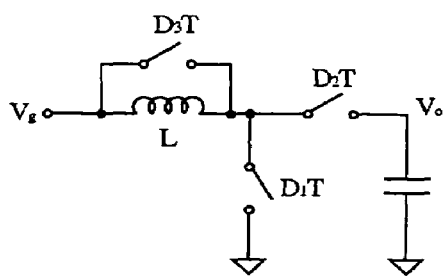
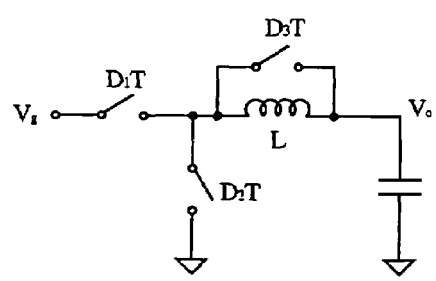
Fig. 7(a)   Fig. 7(b)

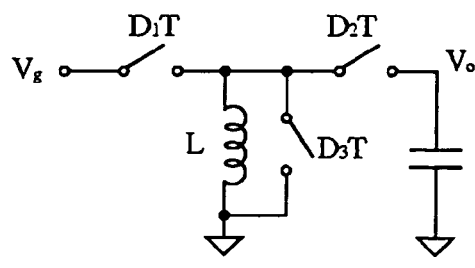
Fig. 7(c)
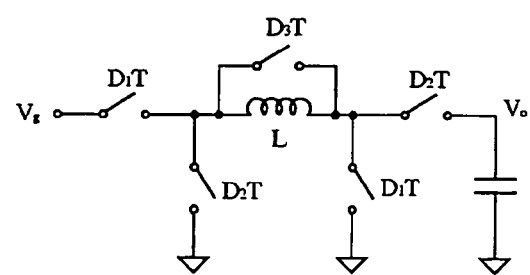
Fig. 7(d)
Fig. 7(a)-7(d)

SINGLE-INDUCTOR MULTIPLE-OUTPUT SWITCHING CONVERTERS IN PCCM WITH FREEWHEEL SWITCHING

FIELD OF THE INVENTION

This invention relates to a switching DC/DC converter. More particularly, the invention relates to a single-inductor multiple-output (SIMO) switching converter that operates in a pseudo-continuous conduction mode (PCCM) with freewheel switching.

BACKGROUND OF THE INVENTION

Multiple regulated supply voltages are needed in many electronic applications, which require different supply voltages for different function modules. They are also needed in implementing dynamic voltage scaling techniques to effectively reduce the power consumption of a system. Possible applications include personal digital assistants (PDAs), notebook computers, System-on-a-Chips (SoCs) for signal processing, microprocessors, power amplifiers for 3G W-CDMA transceivers and ADSLs, and so on. Among existing multiple-supply implementations, a single-inductor multiple-output (SIMO) switching converter is a very cost-effective solution. SIMO converters require only one off-chip inductor and fewer on-chip power switches that help reduce system volume and save chip area. In addition, they are helpful in reducing EMI and cross couplings due to the presence of inductors and transformers, since the number of these magnetic components has been reduced to one.

However, existing SIMO converters either work in a continuous conduction mode (CCM) or discontinuous conduction mode (DCM). A CCM SIMO converter suffers from cross-regulation problems from having possible negative inductor current at light loads and hence low efficiency. A DCM SIMO converter has large peak inductor current and current ripple at heavy loads. This leads to large switching noise and imposes enormous current stress on the system.

It would be desirable to develop a new working mode for a SIMO switching converter, which not only inherits the merits of a DCM SIMO converter in suppressing cross regulation, but also is capable of handling large current stress at heavy loads. In addition, it is preferred to implement this working mode with very few components, because too many additional components would decrease the efficiency and increase the cost and volume of the system.

It would also be desirable that the design can be flexibly extended to have single or multiple outputs and for converters with different DC-DC conversion types such as the buck, boost and flyback converters for different application requirements.

PRIOR ART

A number of approaches have been proposed in developing SIMO switching converters. U.S. Pat. No. 6,075,295 discloses a SIMO converter operating at the boundary of CCM and DCM, with pulse-frequency modulation. When a load at one output changes, the corresponding inductor charging and discharging times have to be adjusted accordingly to give an equivalent output power. However, this action also changes the whole switching period, and hence affects the duty ratios of the other outputs. As a result, although only one subconverter has a load change, the others also suffer variations in their respective duty ratios, current ripples and output voltages. This phenomenon is known as cross regulation. If large load changes occur simultaneously at the outputs, the converter may fail to operate. In addition, the converter works with variable switching frequency that leads to the shifting in noise spectrum in the frequency domain, which is not preferred in many applications, e.g. a wireless transceiver.

Multiple-output converters in U.S. Pat. No. 5,617,015 work in either CCM or DCM. For the CCM case, similar cross regulation problem also exists. For the DCM case, because hysteretic control is adopted, the noise spectrum of the converter also shifts as mentioned above.

If the converter works in DCM with a fixed switching frequency as in [1]*, the subconverters can be isolated by the time slots during which all the switches are off. Each subconverter adjusts its own duty ratio and the switch-off time slot according to the load, but will not affect the others. This successfully suppresses cross regulation. However, this scheme imposes a power limitation on the converter. To keep working in DCM, each subconverter cannot deliver a large output power. To supply heavy loads, an inductor with a small value has to be used. However, this leads to a larger peak inductor current and current ripple that imposes large current stress on the components in the power stage. In addition, the inductor current flows through all the power devices in every switching period, introducing very large switching noise into the whole system. This is not preferred for many noise-sensitive circuits and devices. Furthermore, the large current ripple gives large output voltage ripples, which is undesirable. To retain small ripple at each output, larger filtering capacitors have to be used. However, this leads to a slow dynamic response, because a larger capacitor reduces the bandwidth of the loop gain of the subconverter.

*[1] D. Ma, W-H Ki, C-Y Tsui and P. K. T. Mok, "A single-Inductor Dual-Output Integrated DC/DC Boost Converter for Variable Voltage Scheduling," IEEE/ACM Asia and South Pacific Automation Design Conference, pp. 19-20, January 2001.

In view of the foregoing, there are strong demands on an effective means for operating SIMO converters with low cross regulation, but being capable of handling the large current stress at heavy loads.

SUMMARY OF THE INVENTION

It is an object of the present invention to propose a DC-DC converter to provide multiple independently regulated outputs, which is capable of suppressing cross regulation between the subconverters and handling large current stress at heavy loads.

It is also an object of the present invention to propose an operation mode in a DC-DC converter, which boosts the DC level of the inductor current as in the CCM case and overcomes the power limitation in the DCM case.

In accordance with these and other objects of the present invention, a SIMO converter operating in a pseudo-continuous conduction mode with freewheel switching is disclosed. The converter provides a sequence of non-overlapping switching phases for each output with time-multiplexing control. The energy is then transferred to each output in the corresponding phase. A freewheel switch shorts the inductor when the inductor current drops to a predefined value during the inductor discharging state. Isolation phases are then activated, and the inductor current stays constant. This enables the converter to provide larger power than the DCM counterparts.

The switching converter according to the invention is of particular advantage if applied in an electronic appliance, such as, but not limited to, a portable electronic device.

BRIEF DESCRIPTION OF THE DRAWINGS

Some embodiments of the invention will now be described by way of example and with reference to the accompanying drawings, in which:

FIG. 6(a)-6(i) are schematic diagrams of exemplary embodiments of the present invention showing multiple-output switching converters for different DC-DC conversions.

FIG. 7(a)-7(d) are schematic diagrams of exemplary embodiments of the present invention showing single-output switching converters for different DC-DC conversions.

DETAILED DESCRIPTION OF THE INVENTION

Figure 1:
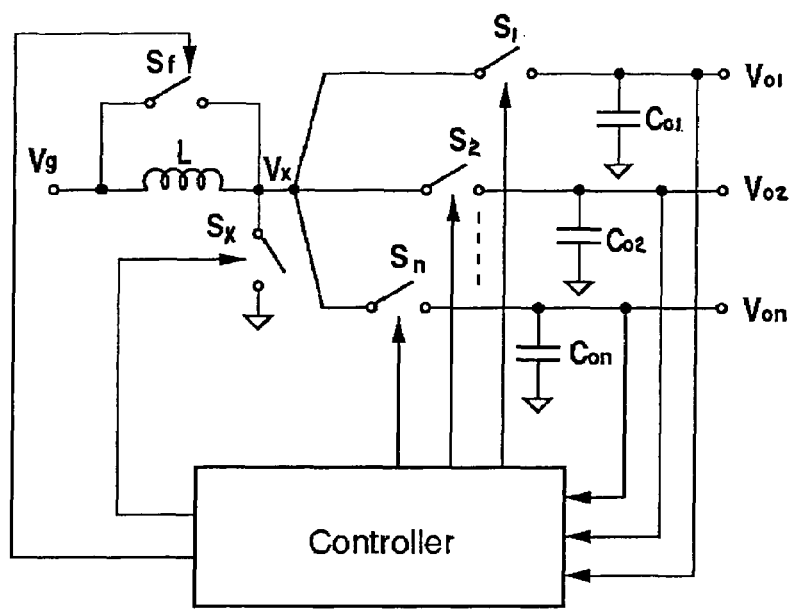
FIG. 1 is a block schematic diagram of an exemplary embodiment of the present invention showing a SIMO boost switching converter.

One SIMO switching boost converter implemented in accordance with the principles of the present invention is show in FIG. 1. The converter includes an inductor L, coupled between the input $V_g$ and the node $V_x$. A main switch $S_x$ is coupled in series with the inductor L between the node $V_x$ and ground. A switch $S_f$ is coupled across the inductor L. An auxiliary switch $S_1$ is coupled between the node $V_x$ and the output $V_{o1}$, and an auxiliary switch $S_2$ is coupled between the node $V_x$ and the output $V_{o2}$. An output capacitor $C_{o1}$ is coupled between the output $V_{o1}$ and ground, while an output capacitor $C_{o2}$ is coupled between the output $V_{o2}$ and ground.

The present invention may include more than two independently regulated output voltages. Accordingly, FIG. 1 shows another auxiliary switch $S_n$ coupled from the node $V_x$ to an output $V_{on}$. An output capacitor $C_{on}$ is then coupled between the output $V_{on}$ and ground. As used herein, the letter n represents an integer greater than 2.

Figure 2:
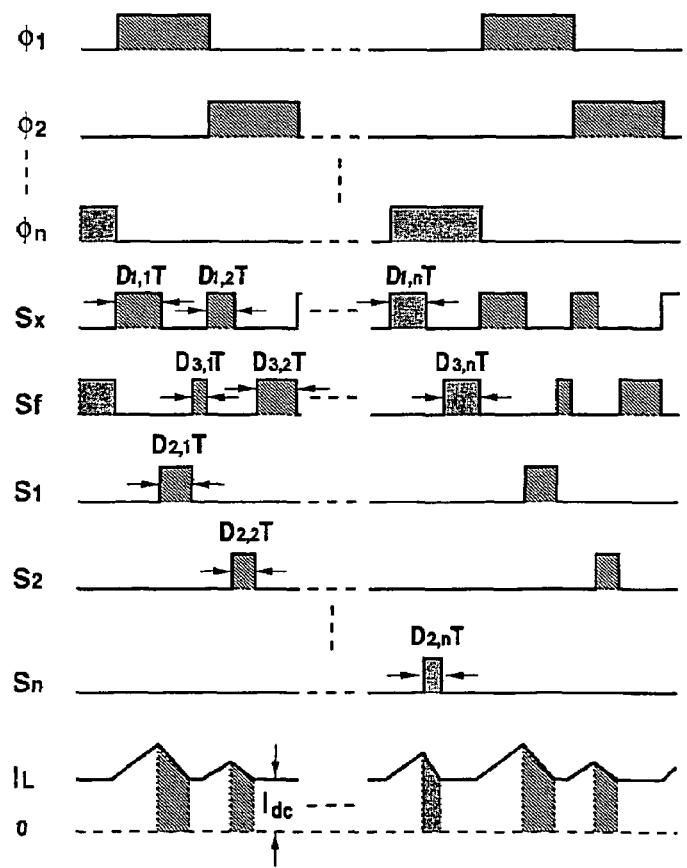
FIG. 2 is a timing diagram of a SIMO boost converter of FIG. 1.

The timing diagram in FIG. 2 illustrates one possible operation scheme of the switching converter in FIG. 1. The SIMO boost switching converter in FIG. 1 can be regarded as n single-output boost subconverters. Each subconverter includes one auxiliary switch, one output terminal, one output capacitor, and the shared inductor L, main switch $S_x$ and switch $S_f$. The subconverters 1 to n work in n non-overlapping phases $\phi_1, \phi_2, \ldots,$ and $\phi_n$, respectively. When $\phi_1$ is effective ($\phi_1=1$), only subconverter 1 is activated. Switch $S_x$ is turned on first, and all the other switches are open. The energy is charged into the inductor L and the inductor current $I_L$ ramps up at a rate of $V_g/L$ from a predefined current level $I_{dc}$ (instead of zero in the DCM case) until $D_{1,1}T$ expires. Here, $D_{1,1}$ is the duty ratio of subconverter 1, which is determined by the controller according to the voltage level and the load at $V_{o1}$. During $D_{2,1}T$, $S_x$ is open, $S_1$ is closed and the other switches are open. The energy stored in the inductor L is transferred to the output $V_{o1}$. The inductor current $I_L$ ramps down at a rate of $-(V_{o1}-V_g)/L$ and flows into the output $V_{o1}$. When the inductor current $I_L$ reduces to $I_{dc}$, the switch $S_1$ is turned off. The switch $S_f$ is then turned on, shorting the inductor and forcing the inductor current $I_L$ to circulate through the inductor L and switch $S_f$. Since the inductor current slope is determined by the voltage across the inductor, when the voltage on the inductor is zero, the inductor current keeps unchanged. This allows the inductor current $I_L$ to stay constant at $I_{dc}$ until $\phi_1$ expires. We call the switching action of the switch $S_f$ a freewheel switching. When $\phi_2=1$, subconverter 1 is then off, and the above switching action repeats for subconverter 2. The subsequent subconverters perform the same operations in turns, when the corresponding phase is active.

Note that the inductor current now is boosted by a DC level of $I_{dc}$ (instead of zero in the DCM case). This eliminates the power constraints in the DCM case. When the converter is with heavy loads, $I_{dc}$ is increased to allow more power to be delivered to the outputs. Current ripple and peak inductor current can be reduced, since a larger inductor can be used.

Compared to the CCM case, the inductor current is reset and stays constant at $I_{dc}$ in each switching phase, which successfully isolates the subconverters. A load change at $V_{o1}$ can be adjusted by changing $D_{1,1}T$, $D_{2,1}T$, and the freewheel switching time $D_{3,1}T$, but does not affect the other subconverters. Similarly, load changes at other outputs can also be adjusted independently. Therefore, the converter retains low cross regulation.

Note that the inductor current stays above zero and is continuous. Yet, the converter actually works in DCM in disguise, because the zero DC current in a DCM converter is now replaced by a constant $I_{dc}$. We name this working mode the pseudo-continuous conduction mode (PCCM).

The DC current level $I_{dc}$ is determined by the corresponding load and current ripple requirements. It can be adjusted to be larger to supply more current to a large load. At light loads, it can be adjusted to be small to reduce the power loss due to the switch $S_f$. When the load currents are extremely small, $I_{dc}$ can be reduced to zero. When $I_{dc}$ is set to zero, the converter goes from PCCM to DCM. Because there is no power loss from the switch $S_f$ in DCM, it helps the converter to maintain high efficiency at light loads. During $D_{3,i}T$ (i=1, 2, ..., n) when all the switches are open, the inductor L and parasitic capacitor between the node $V_x$ and ground forms a resonant tank, thus ringing occurs and causes noise in the converter. For this PCCM converter, freewheel switching breaks the oscillation loop by shorting the inductor L and ringing is thus effectively suppressed.

Figure 3:
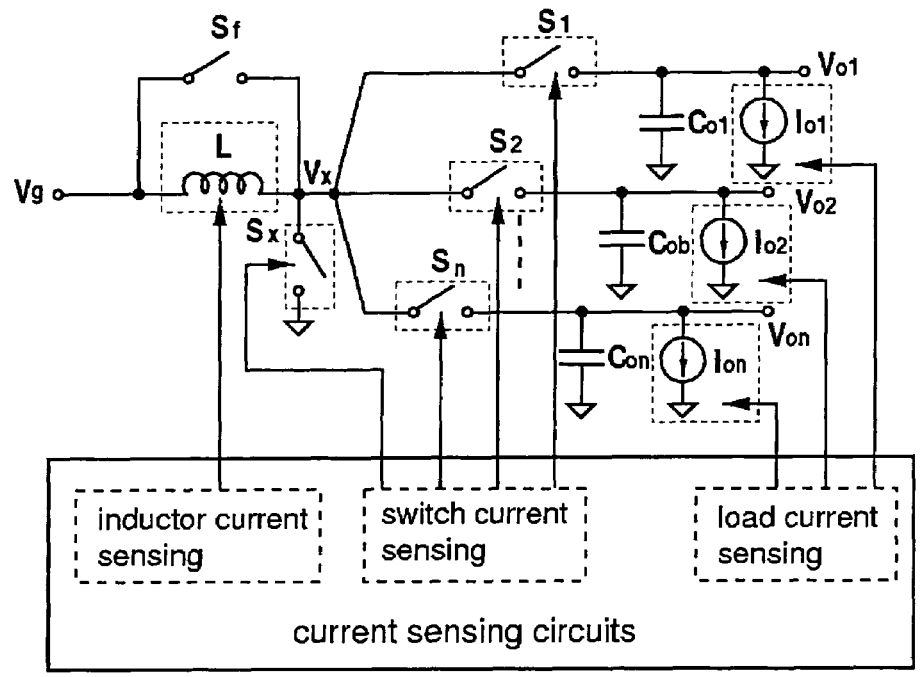
FIG. 3 shows possible current sensing mechanisms applied to a SIMO boost converter of FIG. 1.
Figure 4:
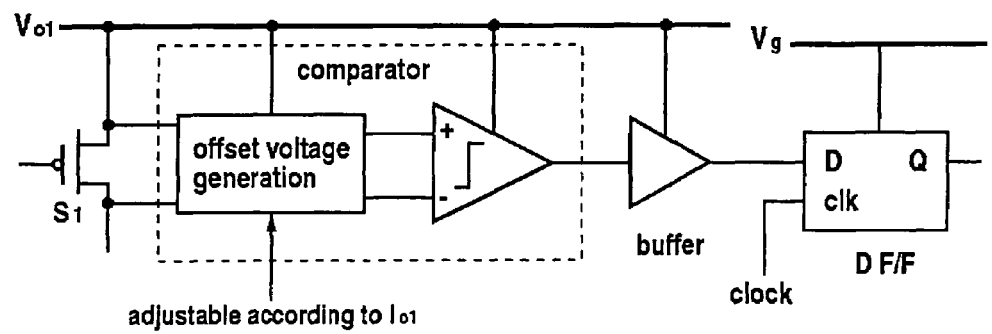
FIG. 4 is an exemplary embodiment of a current sensing circuit.

To evaluate the status of the loads and define the value of $I_{dc}$, current sensing mechanisms are essential, which can be achieved in different ways as shown in FIG. 3: it can be done by sensing the inductor current, or sensing the currents of the switches, or sensing the load currents at the outputs, or any possible combinations of the mentioned current sensing methods. FIG. 4 gives an example of current sensing method by sensing the current of the switch $S_1$. The sensor is implemented by a voltage comparator with adjustable offset voltage. This offset voltage is controlled to be equal to the voltage on $S_1$ when the current passing through $S_1$ is equal to $I_{dc}$. When the voltage on $S_1$ is equal to the predefined offset voltage, the comparator changes the state. This technique can be applied to any other switches, which are implemented by, but not limited to, either bipolar or MOSFET transistors.

Figure 5:
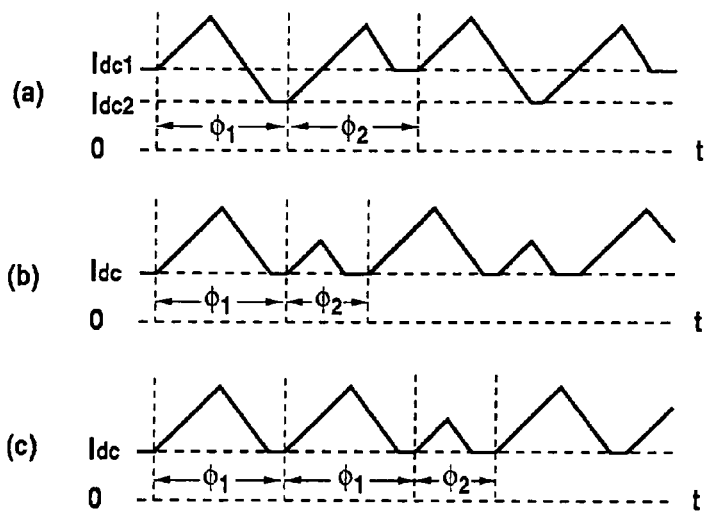
FIG. 5(a)-5(c) are three possible settings of current level $I_{dc}$s and switching phases for the present invention.

Although each subconverter uses the same DC current level $I_{dc}$ for the PCCM working mode in FIG. 2, the DC current level of each subconverter can be set to be different, as shown in FIG. 5(a). This is especially useful when they have unbalanced loads. We may also assign switching phases with different durations according to different loads, as shown in FIG. 5(b). For very large loads, switching phases having consecutive large durations can be assigned, as shown in FIG. 5(c). It is clear that any combinations of different $I_{dc}$s and different switching phases and durations in all the above cases can be used.

Figure 6A:
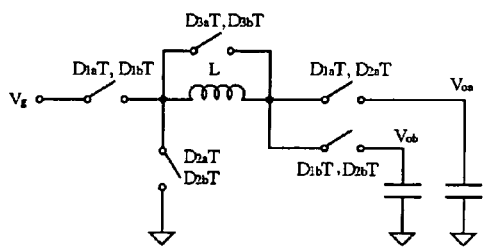
Figure 6B:
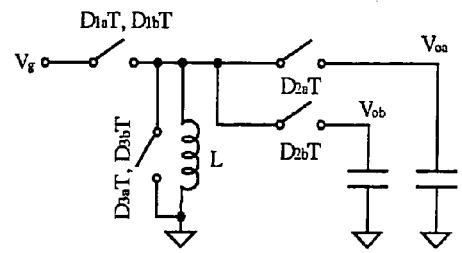
Figure 6C:
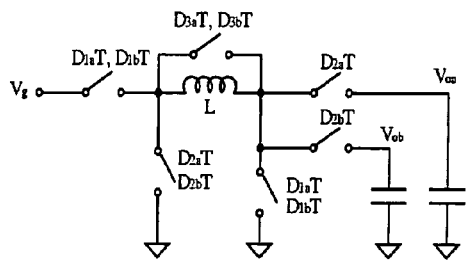
Figure 6D:
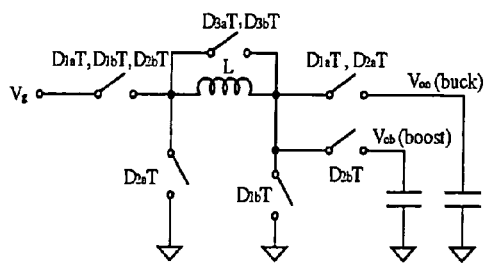

The principles of the present invention can be used with various SIMO switching converter configurations for different DC-DC conversions. The circuit shown in FIG. 1 is a boost topology, which provides output voltages larger than the input voltage $V_g$. FIG. 6(a) shows an example of an embodiment of the present invention in a buck topology, which provides output voltages smaller than the input voltage $V_g$. FIG. 6(b) shows an example of an embodiment of the present invention in a flyback topology. The output voltages of this converter could be either smaller or larger than the input voltage $V_g$ in amplitude, but with an opposite polarity to $V_g$. FIG. 6(c) shows an example of an embodiment of the present invention in a non-inverting flyback topology. The output voltages of this converter could be either smaller than or larger than the input voltage $V_g$ in amplitude and with the same polarity as $V_g$. We can also combine different topologies to form a SIMO converter. For example, FIG. 6(d) shows a buck-boost converter. In this configuration, one subconverter achieves buck conversion, while the other achieves boost conversion. Accordingly, more combinations can be derived for different DC-DC conversions. FIG. 6(e) shows a buck-flyback converter. FIG. 6(f) shows a buck-flyback(non-inverting) converter. FIG. 6(g) shows a boost-flyback converter and FIG. 6(h) shows a boost-flyback(non-inverting) converter. FIG. 6(i) shows a flyback(non-inverting)-flyback converter.

Although FIGS. 5(a)-5(c) and FIGS. 6(a)-6(i) show converters with two outputs, it is apparent that the principle of the present invention is valid to the converters with more than two outputs as the circuit shown in FIG. 1. Each of the circuits in the above figures and the corresponding extensions can be implemented and operated in accordance with the principle of the present invention.

The proposed PCCM operation and freewheel switching can also be used in single-output converters. FIG. 7(a) shows a single-output boost converter in PCCM with freewheel switching. When a boost converter operates in CCM, there is a low-frequency right-half-plane zero in the transfer function of the loop gain. Dominant pole compensation gives a very low bandwidth and affects the transient response of the converter. When the converter operates in PCCM, the zero is eliminated from the loop gain. At the same time, the pole due to the load is pushed to a higher frequency, because the equivalent load resistance is smaller in PCCM compared to the DCM counterpart. Therefore, a larger bandwidth is achieved and the transient response is improved. Similarly, this technique can be applied to all single-output DC-DC converters. FIGS. 7(b)-7(d) show three other topologies (buck, flyback and non-inverting flyback) for different DC-DC conversions.

Although preferred embodiments of the inventions have been disclosed, with various components connected to other components, persons skilled in the art will appreciate that it may not be necessary for such connections to be direct and additional components may be interconnected between the shown connected components without departing from the spirit of the invention as shown. Persons skilled in the art will appreciate also that the present invention can be practiced by other than the described embodiments. The described embodiments are presented for purposes of illustrations and not of limitation, and the present invention is limited only by the claims which follow.

What is claimed is:

1. A circuit comprising:
   (a) a main switch and an inductive element coupled in series with a source of electric potential;
   (b) a switch for freewheel switching coupled in parallel with said inductive element;
   (c) a first auxiliary switch having a first end coupled with a node between said main switch and said inductive element, and a second end coupled with first output;
   (d) a second auxiliary switch having a first end coupled with a node between said main switch and said inductive element, and a second end coupled with a second output; and
   (e) a switch control, configured to selectively close the main switch during a first time period of a switching phase, said first or second auxiliary switch during a second time period of the switching phase, and the switch for freewheel switching during a third time period of the switching phase when current through the inductive element drops down to a re-defined current level above zero, said switch control being further configured to maintain the current through said inductive element at the pre-defined current level during the third time period and at least at the pre-defined current level during the first and second time periods of the switching phase.

2. The circuit of claim 1, wherein said main switch, said first and second auxiliary switches, and said switch for freewheel switching are bipolar transistors.

3. The circuit of claim 1, wherein said main switch, said first and second auxiliary switches, and said switch for freewheel switching are MOSFET transistors.

4. The circuit of claim 1, wherein said main switch, said first and second auxiliary switches, and said switch for freewheel switching are either bipolar or MOSFET transistors.

5. The circuit of claim 1, wherein at least one of said first and second auxiliary switches is a diode.

6. The circuit of claim 1, further comprising:
   a diode in series with said first auxiliary switch;
   a diode in series with said second auxiliary switch; and
   a diode in series with said switch for freewheel switching.

7. The circuit of claim 1, wherein said source of electrical potential is between a positive supply voltage and ground.

8. The circuit of claim 1, wherein said source of electrical potential is between a positive supply voltage and a negative supply voltage.

9. The circuit of claim 1, wherein said source of electrical potential is between two different supply voltages of like polarity.

10. The circuit of claim 1, wherein said first output is produced at a first output terminal, said second output is produced at a second output terminal, and said source of electrical potential is across first and second input terminals.

11. The circuit of claim 10, further comprising:
    a first output capacitor coupled to said first output terminal; and
    a second output capacitor coupled to said second output terminal.

12. The circuit of claim 1, wherein said switch control includes time sequencing logic that controls switching states of said first and second auxiliary switches such that said first and second auxiliary switches are charged alternately on a pulse-by-pulse basis.

13. The circuit of claim 1, further comprises a current sensing circuit to detect at least one of current and voltage of at least one of said main switch, said auxiliary switches, said inductive element, and said output, or any combination of current and voltage of said main switch, said auxiliary switches, said inductive element and said output; and
    a circuit to determine the pre-defined current level for freewheel switching in each switching cycle.

14. A circuit for providing a plurality of independently regulated output voltages, said circuit comprising:
   (a) a main switch and an inductive element coupled in series with a source of electric potential;
   (b) a switch for freewheel switching coupled in parallel with said inductive element;
   (c) at least two auxiliary switches, each having a first end coupled with a node between said main switch and said inductive element, and a second end coupled with a corresponding output; and
   (d) a switch control, configured to close only the main switch during a first time period of a switching phase, close only one of said auxiliary switches during a second time period of the switching phase, and close only the switch for freewheel switching during a third time period of the switching phase when current through the inductive element drops down to a pre-defined current level above zero, said switch control being configured to maintain the current through said inductive element at the pre-defined current level during the third time period and at least at the pre-defined current level during the first and second time periods of the switching phase.

15. A circuit for providing a single regulated output voltage, said circuit comprising:
   (a) a main switch and an inductive element coupled in series with a source of electric potential;
   (b) a switch for freewheel switching coupled in parallel with said inductive element;
   (c) an auxiliary switch, coupled at said output to a node between said main switch and said inductive element; and
   (d) a switch control configured to selectively close the main switch during a first time period of a switching phase, said auxiliary switch during a second time period of the switching phase, and the switch for freewheel switching during a third time period of the switching phase when current through the inductive element drops down to a pre-defined current level above zero, said switch control being configured to maintain the current through said inductive element at the pre-defined current level during the third time period and at least at the pre-defined current level during the first and second time periods of the switching phase.

16. The circuit of claim 13, wherein
   said switch control includes said current sensing circuit to detect at least one of a current and voltage of at least one of said main switch, said first auxiliary switch, said second auxiliary switch, said inductive element, said first output, and said second output; and
   said current sensing circuit includes said circuit which is configured to determine the pre-defined current level of each switching phase.

17. The circuit of claim 14, further comprises a current sensing circuit to detect at least one of current and voltage of at least one of said main switch, said auxiliary switches, said inductive element, and said output, or any combination of current and voltage of said main switch, said auxiliary switches, said inductive element and said output; and
   a circuit to determine the pre-defined current level for freewheel switching in each switching cycle.

18. The circuit of claim 15, further comprises a current sensing circuit to detect at least one of current and voltage of at least one of said main switch, said auxiliary switch, said inductive element, and said output, or any combination of current and voltage of said main switch, said auxiliary switch, said inductive element and said output; and
   a circuit to determine the pre-defined current level for freewheel switching in each switching cycle.

* * * * *